United States Patent
Bai

(10) Patent No.: US 10,939,303 B2
(45) Date of Patent: Mar. 2, 2021

(54) PLACING ACCESS POINT

(71) Applicant: NEW H3C TECHNOLOGIES CO., LTD., Hangzhou (CN)

(72) Inventor: Yang Bai, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 99 days.

(21) Appl. No.: 16/329,148

(22) PCT Filed: Aug. 30, 2017

(86) PCT No.: PCT/CN2017/099721
§ 371 (c)(1),
(2) Date: Feb. 27, 2019

(87) PCT Pub. No.: WO2018/041150
PCT Pub. Date: Mar. 8, 2018

(65) Prior Publication Data
US 2019/0208425 A1     Jul. 4, 2019

(30) Foreign Application Priority Data
Aug. 30, 2016   (CN) .......................... 201610762357.2

(51) Int. Cl.
*H04W 16/18*    (2009.01)
*H04B 17/318*   (2015.01)
(Continued)

(52) U.S. Cl.
CPC .......... *H04W 16/18* (2013.01); *H04B 17/318* (2015.01); *H04W 64/003* (2013.01); *H04W 84/12* (2013.01)

(58) Field of Classification Search
CPC .. H04B 17/318; H04W 16/18; H04W 64/003; H04W 84/12
See application file for complete search history.

(56) References Cited

U.S. PATENT DOCUMENTS

| | | | |
|---|---|---|---|
| 7,315,743 B1 * | 1/2008 | Frank ................... | H04W 16/18 455/446 |
| 2002/0075825 A1 * | 6/2002 | Hills ................... | H04B 17/318 370/329 |

(Continued)

FOREIGN PATENT DOCUMENTS

| | | |
|---|---|---|
| CN | 102056180 A | 5/2011 |
| CN | 102083081 A | 6/2011 |

(Continued)

OTHER PUBLICATIONS

Japanese Patent Office, Office Action Issued in Application No. 2019-511722, dated Jan. 28, 2020, 5 pages. (Submitted with Machine Translation).

(Continued)

*Primary Examiner* — Stephen J Clawson
(74) *Attorney, Agent, or Firm* — McCoy Russell LLP

(57) ABSTRACT

Methods and devices for placing an Access Point (AP) are provided. In one aspect, a method includes obtaining a sampling point matrix by performing sampling in a locating area based on a preset sampling spacing, wherein the locating area comprises: a valid area to be covered by a WLAN and an invalid area outside the valid area, calculating a maximum valid signal strength, sequentially selecting a sampling point without placing AP is placed from the sampling point matrix to be a first sampling point at which an AP is to be placed, calculating a newly-added valid signal strength and a newly-added invalid signal strength in a case that the AP to be placed is placed at the first sampling point, and placing the AP to be placed at the first sampling point when preset conditions are satisfied.

12 Claims, 7 Drawing Sheets

(51) Int. Cl.
H04W 64/00 (2009.01)
*H04W 84/12* (2009.01)

(56) References Cited

U.S. PATENT DOCUMENTS

| | | | | |
|---|---|---|---|---|
| 2002/0142788 | A1* | 10/2002 | Chawla | H04W 16/18 455/504 |
| 2004/0214583 | A1* | 10/2004 | Graham | H04W 16/18 455/453 |
| 2006/0094375 | A1* | 5/2006 | McGinley | H04W 16/18 455/90.3 |
| 2008/0085699 | A1* | 4/2008 | Hirano | H04W 36/0061 455/414.2 |
| 2009/0047909 | A1* | 2/2009 | Yamada | G01S 5/0278 455/67.11 |
| 2010/0103868 | A1* | 4/2010 | Meng | H04W 16/18 370/328 |
| 2010/0150027 | A1* | 6/2010 | Atwal | H04W 16/18 370/254 |
| 2010/0150061 | A1 | 6/2010 | Cho et al. | |
| 2012/0099481 | A1 | 4/2012 | Dong et al. | |
| 2014/0057638 | A1 | 2/2014 | Carey et al. | |
| 2015/0189533 | A1* | 7/2015 | Fehske | H04W 16/18 370/229 |
| 2016/0127916 | A1 | 5/2016 | Li et al. | |
| 2016/0182164 | A1* | 6/2016 | Wang | H04W 24/10 455/423 |
| 2016/0374046 | A1* | 12/2016 | Wirola | H04W 64/00 |
| 2017/0086052 | A1* | 3/2017 | Hunukumbure | H04W 64/003 |
| 2019/0200318 | A1* | 6/2019 | Wirola | G01S 5/0263 |

FOREIGN PATENT DOCUMENTS

| | | |
|---|---|---|
| CN | 102547758 A | 7/2012 |
| CN | 102932803 A | 2/2013 |
| CN | 103428710 A | 12/2013 |
| CN | 103442378 A | 12/2013 |
| CN | 105554774 A | 5/2016 |
| JP | H08214363 A | 8/1996 |
| JP | 2004201269 A | 7/2004 |
| JP | 2013046362 A | 3/2013 |
| JP | 2016092835 A | 5/2016 |
| WO | 2010040799 A1 | 4/2010 |
| WO | 2014011145 A1 | 1/2014 |

OTHER PUBLICATIONS

ISA State Intellectual Property Office of the People's Republic of China, International Search Report Issued in Application No. PCT/CN2017/099721, dated Oct. 13, 2017, WIPO, 4 pages.
Khalek, A. et al., "Optimization Models and Algorithms for Joint Uplink/Downlink UMTS Radio Network Planning With SIR-Based Power Control," IEEE Transactions on Vehicular Technology, vol. 60, No. 4, May 2011, Available Online Mar. 28, 2011, 14 pages.
ISA State Intellectual Property Office of the People's Republic of China, Written Opinion of the International Searching Authority Issued in Application No. PCT/CN2017/099721, dated Oct. 13, 2017, WIPO, 5 pages.
European Patent Office, Extended European Search Report Issued in Application No. 17845452.6, dated Jun. 25, 2019, Germany, 10 pages.
State Intellectual Property Office of the People's Republic of China, Office Action and Search Report Issued in Application No. 201610762357.2, dated Jul. 22, 2019, 7 pages. (Submitted with Partial Translation).

* cited by examiner

PLACING ACCESS POINT

CROSS REFERENCE TO RELATED APPLICATIONS

This present application is a U.S. National Phase of International Patent Application Serial No. PCT/CN2017/099721 entitled "AP PLACEMENT," filed on Aug. 30, 2017. International Patent Application Serial No. PCT/CN2017/099721 claims priority to Chinese Patent Application No. 201610762357.2 filed on Aug. 30, 2016. The entire contents of each of the above-cited applications are hereby incorporated by reference in their entirety for all purposes.

BACKGROUND

At present, Wireless Local Area Network (WLAN) technology is one of hotspot technologies in communication fields. Compared with a wired network, the WLAN is relatively simpler for initialization and implementation, and is lower for maintenance cost. Generally, a local area network covering an entire building or area can be established by only placing one or more Access Points (APs).

DETAILED DESCRIPTION OF THE EMBODIMENTS

Figure 1:
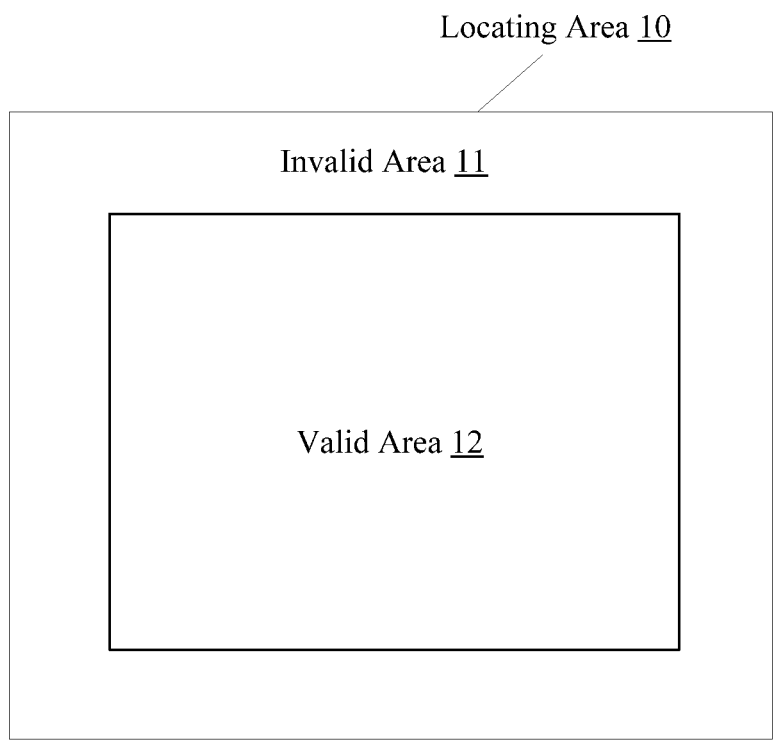
FIG. 1 is a schematic diagram illustrating a locating area based on an example of the present disclosure.

The foregoing disclosure is merely illustrative of preferred embodiments of the disclosure but is not intended to limit the disclosure, and any modifications, equivalent substitutions, adaptations, thereof made without departing from the spirit and scope of the disclosure shall be encompassed in the claimed scope of the appended claims.

The technical solutions of embodiments of the present disclosure will be described clearly and fully below in combination with drawings in the embodiments of the present disclosure. It is apparent that the described embodiments are merely part of embodiments of the present disclosure rather than all embodiments. Other embodiments achieved by those of ordinary skill in the art based on the embodiments in the present disclosure without paying creative work shall all fall into the scope of protection of the present disclosure.

Example embodiments will be described in detail herein with the examples indicated in the drawings. When the following descriptions involve the drawings, like numerals in different drawings represent like or similar elements unless stated otherwise. The implementations described in the following example embodiments do not represent all implementations consistent with the present disclosure. On the contrary, they are examples of a device and a method consistent with some aspects of the present disclosure as described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

In a practical implementing process, network planning is performed based on actual demands before a WLAN is constructed, where a key point therein includes calculating a placing location of an AP. In an example, an AP is placed based on a cellular hexagon or a square by starting from a center point of a coverage area. A side length of the hexagon or the square is a fixed value, which can be obtained by performing calculation based on at least one of parameters such as a signal strength of an AP, the number of online users and a bandwidth, etc. However, the method above may cause problems as follows: a boundary area cannot have good signal coverage; and a most coverage range of an AP placed in the boundary area falls outside the coverage area in a way that a waste is caused, etc.

Methods, devices and apparatus for placing an AP are provided in examples of the present disclosure below. Based on the examples of the present disclosure below, an area to be covered by a WLAN is referred to as a valid area, and an area outside the valid area is referred to as an invalid area. For example, as shown in FIG. 1, a limited area outside a valid area 12 is selected to be an invalid area 11 which does not need to be covered by the WLAN. In an example of the present disclosure, locations for placing APs are determined by performing WLAN planning in a locating area, where the locating area includes the valid area and the invalid area. Taking the valid area and the invalid area being rectangular areas as an example to make description. However, specific shapes of the valid area and the invalid area are not limited in examples of the present disclosure.

Figure 2:
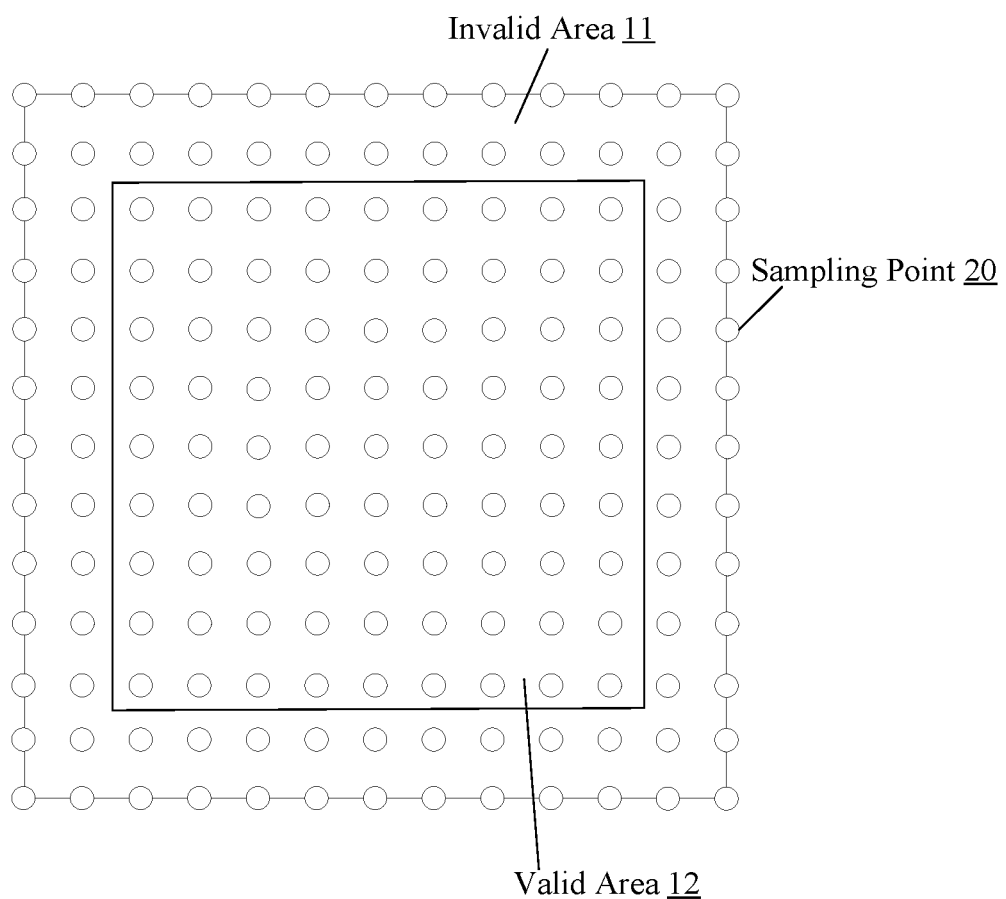
FIG. 2 is a schematic diagram illustrating a sampling point matrix based on an example of the present disclosure.

Based on a preset sampling spacing I, sampling is performed in a locating area 10 as shown in FIG. 1 in a way that a sampling point matrix as shown in FIG. 2 is determined, where the sampling point matrix includes a plurality of sampling points distributed in a matrix manner. For example, as shown in FIG. 2, the sampling point matrix includes a plurality of sampling points 20 in the invalid area 11 and the valid area 12. For another example, when a stadium needs to be covered by the WLAN, the stadium is the valid area, and a limited area outside the stadium is selected to be the invalid area. The preset sampling spacing I above may be set based on actual dimensions of the valid area. For example, the preset sampling spacing I may be set to be a value within a range of 0.5 m to 5 m.

In an example, when the valid area is a rectangular area with a length M and a width N, the locating area may be a rectangular area with a length M+2r and a width N+2r, where r expresses a signal coverage radius of an AP. In this case, the sampling point matrix is a matrix of $$\frac{(M+2r)}{I} \times \frac{(N+2r)}{I},$$

and the invalid area is a limited area surrounding the valid area.

In a practical implementing process, when it is required that the total number of users which can be accommodated in the valid area is large, APs need to be densely placed, which is a high-density coverage circumstance. That is, the larger the total number of users required to be accommodated is, the more densely the APs are placed. Thus, when it is known that the valid area is a rectangular area of M×N as well as it is required that the total number of users can be accommodated by the valid area is Sum and the number of users which can be accommodated by a single AP is p, a signal coverage radius r of an AP satisfies the following formula (1):

$$r = \sqrt{\frac{(M \times N) \times P}{\pi \times \text{Sum}}} \quad (1)$$

Thus, APs may be placed more densely if the r is smaller, thereby ensuring that the total number of users which can be accommodated by the valid area can meet actual demands. For example, when M×N=1000, Sum=2000 and p=64, r=3.19 is obtained through calculation based on the formula (1).

In contrast, when it is required that the total number of users which can be accommodated in the valid area is small, APs need to be sparsely placed, which is a low-density coverage circumstance. In this case, the signal coverage radius r of an AP is a signal coverage radius based on a capability of the AP.

In a practical network planning process, the sampling operation above may be performed according to a map including the locating area.

Figure 3:
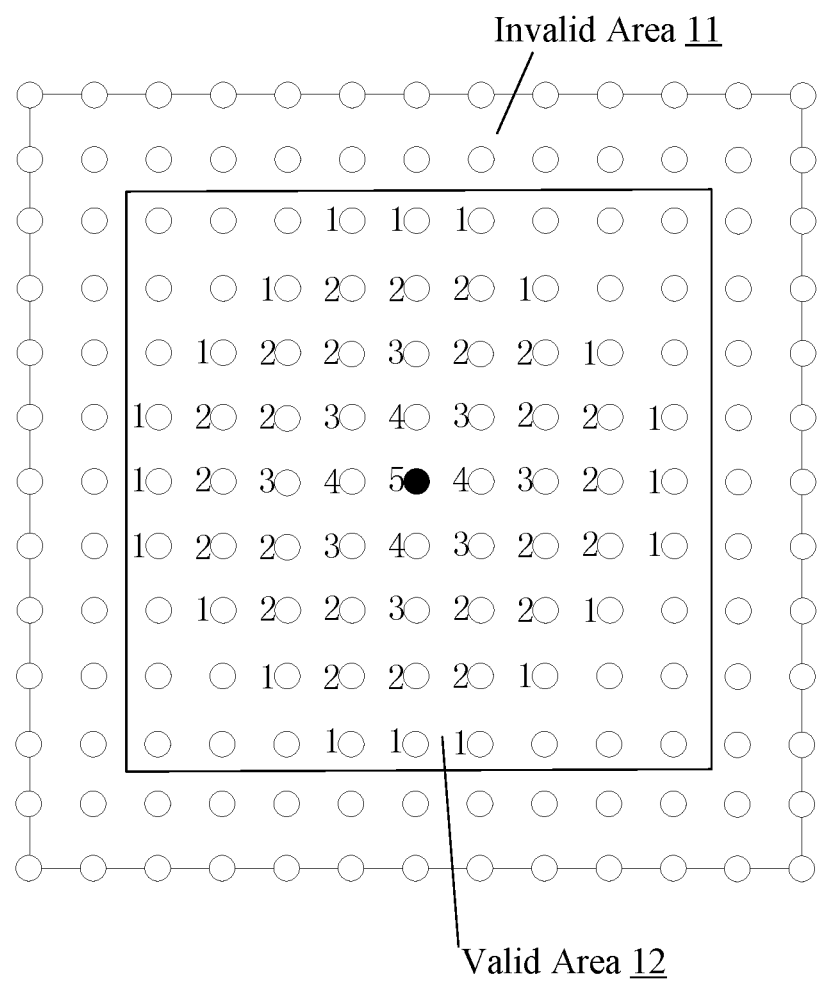
FIG. 3 is a schematic diagram illustrating signal strengths generated at sampling points by an AP when calculating a maximum valid signal strength and a maximum valid count based on an example of the present disclosure.

For example, as shown in FIG. 3, it is assumed that an AP is placed at a black-filled sampling point, an entire coverage range of a signal of the AP is within the valid area, and there is no obstacle in the coverage range of the signal (i.e., a signal coverage range), a sum of signal strengths generated at sampling points by the AP is the maximum valid signal strength $E_{max}$. In a practical calculating process, the signal strength generated at a sampling point by the signal of AP may be a value actually calculated, i.e., an actual signal strength value calculated based on the signal strength of the AP, a signal coverage radius r, a distance between the sampling point and the AP, etc. Alternatively, an indicative value as shown in FIG. 3 is used. In an example, the indicative value is only required to express that the farther a sampling point is from the AP, the lower a signal strength generated at a sampling point by the AP. For example, as shown in FIG. 3, the signal strength at the sampling point where the AP is located is 5, and the signal strength at the sampling points is gradually attenuated to 4, 3, 2 and 1 until 0 along with a distance gradually farther away. When the signal strengths at the sampling points are expressed through indicative values as shown in FIG. 3, it may be obtained through calculation that $E_{max}$=113.

It should be noted that since the signal strength of each sampling point may not necessarily be expressed as a real signal strength value associated with a signal strength of an AP, a maximum value of a sum of signal strengths may not necessarily be obtained based on real signal strength values. For example, the signal strength generated at each sampling point by an AP may be expressed as an indicative value. For example, indicative values shown in FIG. 3 may be used, i.e. the indicative values are required to express that the farther the sampling point is from the sampling point at which the AP is located, the lower a signal strength of a sampling point is, thus, the maximum value of the sum of the signal strengths may be expressed as an indicative value. Therefore, the maximum value of the sum of the signal strengths merely expresses a theoretical maximum value which can be reached for an AP in a case without any interference. The maximum value may be an indicative value, or may be a real signal strength value determined based on a signal of an AP, which is not limited herein.

Further, it should be understood that a maximum valid signal strength may be calculated based on a signal coverage capability of an AP and a sampling spacing, etc., which is not related with whether the AP is placed in the valid area or the invalid area when the maximum valid signal strength is calculated. Thus, when the maximum valid signal strength is calculated, it may be assumed that the AP is placed in the valid area in a way that the coverage range of the AP is within the sampling point matrix currently determined as well as there is no interference (e.g., no obstacle) in the signal coverage range of the AP. Under the assumption above, the calculated sum of the signal strengths generated at the sampling point by the signaling of the AP is the maximum value of the sum of the signal strengths, i.e., the maximum valid signal strength.

In some examples, an AP is placed at an edge of the sampling point matrix in a way that a part of the coverage range of the AP is outside the sampling point matrix. In this case, a sampling range is temporarily expanded based on the signal coverage range of the AP, the sampling spacing and the like, so that the signal coverage range of the AP is within the expanded sampling range to calculate the maximum valid signal strength.

It should be clear that, the sampling range is expanded merely when the maximum valid signal strength is calculated. The newly-added valid signal strength and the newly-added invalid signal strength are still subsequently calculated based on the sampling point matrix determined based on the valid area and the invalid area.

Afterwards, each sampling point in the sampling point matrix may be traversed. For example, traversal is performed in an order from left to right and top to bottom. For another example, the traversal is performed in an order of from right to left and bottom to top. In some examples, the traversal is started from a boundary of the valid area, thereby better ensuring that the boundary between the valid area and the invalid area is under a better signal coverage of AP.

Figure 4:
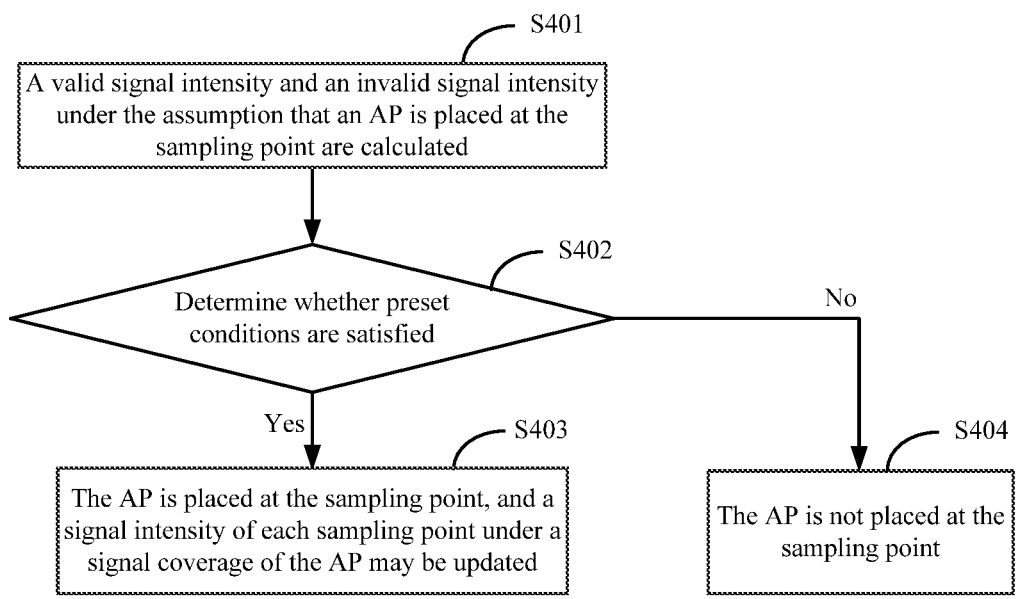
FIG. 4 is a flowchart illustrating a method of placing an AP at a sampling point based on an example of the present disclosure.

For each sampling point, procedures shown in FIG. 4 are executed.

At block S401, under assumption that an AP to be placed is placed at the sampling point, a newly-added valid signal strength $E_{eff}$ and a newly-added invalid signal strength $E_{inv}$ are calculated.

In this block, the sampling point without placing AP is taken as a sampling point at which an AP is to be placed, which may also be referred to as a first sampling point.

The newly-added valid signal strength $E_{eff}$ is a sum of newly-added signal strengths E generated at sampling points in the valid area by the AP, and the newly-added invalid signal strength $E_{inv}$ is a sum of newly-added signal strengths E generated at the sampling points in the invalid area by the AP.

At block S402, based on the newly-added valid signal strength $E_{eff}$ calculated in block S401 and the newly-added invalid signal strength $E_{inv}$ calculated in block S401, it is determined whether preset conditions are satisfied; if yes, block S403 is executed; otherwise, block S404 is executed.

The above preset conditions are:

$$\frac{E_{eff}}{E_{max}} > T \text{ and } \frac{E_{inv}}{E_{max}} < F,$$

where T expresses a preset valid signal strength ratio threshold, and F expresses a preset invalid signal strength ratio threshold. In a practical implementing process, the values of T and F may be preset based on practical demands. For example, T may be preset as 70%, and F may be preset as 20%.

At block S403, the AP is placed at the sampling point, and a signal strength of each sampling point under a signal coverage of the AP may be updated. So far, the method process ends.

In block S403, a method of updating a signal strength of each sampling point under the signal coverage of the AP includes: when a signal strength of the sampling point is stored in local, updating the stored signal strength of the sampling point to a larger value of the signal strength of the sampling point currently stored and E1, where the signal strength currently stored is a signal strength stored in local before the updating process; when no signal strength of the sampling point is stored in local, storing E1 as the signal strength of the sampling point, where E1 expresses a signal strength generated at the sampling point by the AP.

In the example, the sampling point covered by the AP to be placed may also be referred to as a second sampling point.

At block S404, the AP is not placed at the sampling point, so far, the method process ends.

Further, in another example, a maximum valid point count $C_{max}$ may be calculated in block S401, where $C_{max}$ is the total number of sampling points covered by a signal of an AP placed at a sampling point.

In an example, $C_{max}$ may be the total number of the sampling points covered by the signal of the AP used for calculating the maximum valid signal strength. As shown in FIG. 3, when the maximum valid signal strength is calculated, the determined maximum valid signal strength is $E_{max}$=113. It can be seen from FIG. 3 that, the number of the sampling points covered by the signal of the AP is the maximum valid point count: $C_{max}$=57, where the maximum valid point count is unrelated with whether the covered sampling points are located in the valid area or the invalid area. Thus, when each sampling point in the sampling point matrix is traversed and procedure in blocks in FIG. 4 are executed for the sampling point, a newly-added valid point count $C_{add}$ is further calculated under the assumption that the AP to be placed is placed at the sampling point. The newly-added valid point count $C_{add}$ is the number of the sampling points which are covered by the signal of the AP to be placed but not covered by a signal of any AP already placed in the valid area.

Subsequently, in block S402, it is determined whether the preset conditions are satisfied based on the newly-added valid signal strength $E_{eff}$, the newly-added invalid signal strength $E_{inv}$, the newly-added valid point count $C_{add}$. The preset conditions in this case may be:

$$\frac{E_{eff}}{E_{max}} > T, \frac{E_{inv}}{E_{max}} < F \text{ and } \frac{C_{add}}{C_{max}} > G,$$

where G expresses a preset newly-added valid point count ratio threshold. A value of G may be preset based on actual demands. For example, G may be preset to 70%.

Figures 5, 6, 7, 8:
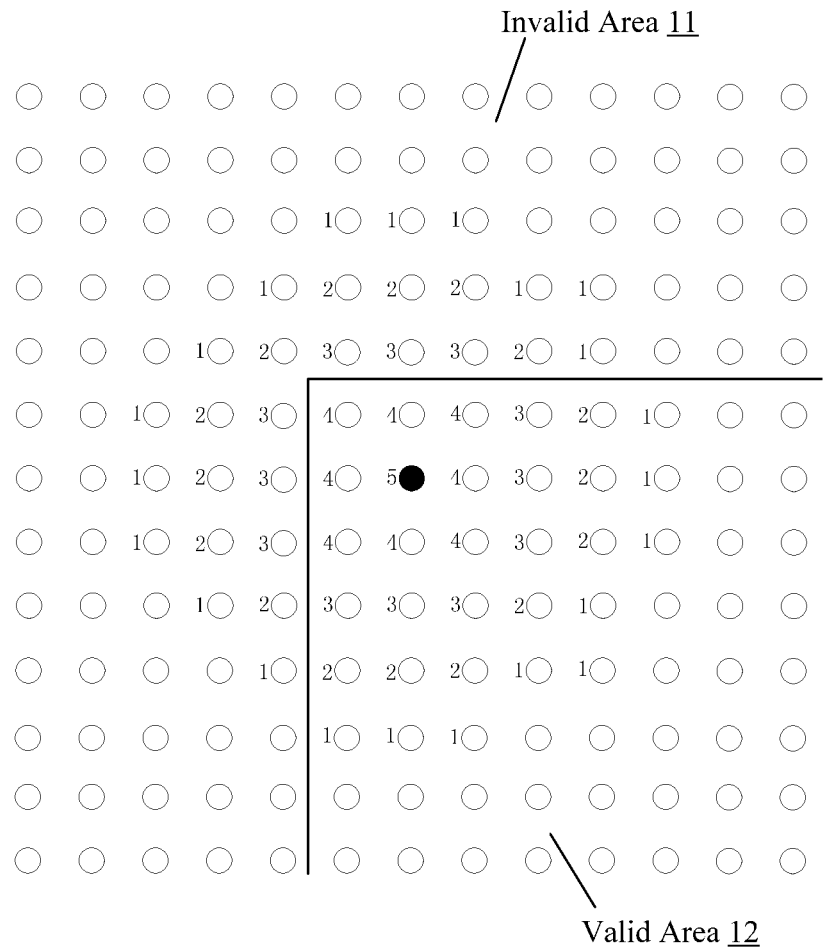
FIG. 5 is a schematic diagram illustrating signal strengths generated at sampling points by an AP when calculating an newly-added valid signal strength, an newly-added invalid signal strength and a newly-added valid point count based on an example of the present disclosure.
FIG. 6 is a schematic diagram illustrating a signal strength generated at a sampling point by an AP1 when signal coverage areas are overlapped based on an example of the present disclosure.
FIG. 7 is a schematic diagram illustrating a signal strength generated at a sampling point by an AP1 when there is an obstacle based on an example of the present disclosure.
FIG. 8 is a schematic diagram illustrating a signal strength of a sampling point after an AP2 is placed as shown in FIG. 7 based on an example of the present disclosure.

For example, when the signal strengths at the sampling points are expressed through indicative values illustrated in FIG. 3, the maximum valid signal strength and the maximum valid point count are respectively calculated as follows: $E_{max}$=113 and $C_{max}$=57. Subsequently, when a black-filled sampling point in FIG. 5 is currently traversed when the traversal is performed for each sampling point in the sampling point matrix, the newly-added valid signal strength, the newly-added invalid signal strength and the newly-added valid point count are respectively calculated as follows under the assumption that the AP to be placed is placed at the sampling point: $E_{eff}$=69, $E_{inv}$=44 and $C_{add}$=30 In block S402, it is determined whether the following is satisfied:

$$\frac{E_{eff}}{E_{max}} = \frac{69}{113} > 70\%, \frac{E_{inv}}{E_{max}} = \frac{44}{113} < 20\% \text{ and } \frac{C_{add}}{C_{max}} = \frac{30}{57} > 70\%.$$

That is, the preset conditions above are not satisfied. If satisfied, the AP is placed at the sampling point.

It is further limited that a ratio obtained by dividing the newly-added valid point count by the maximum valid point count is more than a preset newly-added valid point count ratio threshold, thereby further avoiding that a sampling point is covered repeatedly by APs and reducing coverage conflict.

Further, when the newly-added valid signal strength and the newly-added invalid signal strength are calculated in block S401, the newly-added signal strength E generated at a sampling point by the AP to be placed (i.e., the AP to be placed at the sampling point currently traversed when the traversal is performed for each sampling point in the sampling point matrix) needs to be calculated. In some cases, some conditions need to be taken into account, e.g., signal coverage ranges of a plurality of APs are overlapped, obstacle blockage exist, etc. Methods of calculating a newly-added signal strength E in these cases are described below, respectively.

(1) Signal Coverage Ranges of APs are Overlapped.

In this case, a method of calculating a newly-added signal strength E generated at a sampling point by an AP to be placed is as follows.

It is determined whether the signal strength of the sampling point is stored in local. If yes, the sampling point is not only located within the signal coverage range of the AP to be placed but also located within a signal coverage range of an AP which has been previously placed. In this case, the newly-added signal strength E generated at the sampling point by the AP to be placed satisfies the following formula (2):

$$E = \begin{cases} E1 - E2, E1 > E2 \\ 0, E1 \leq E2 \end{cases}, \quad (2)$$

where E1 expresses the signal strength generated at the sampling point by the AP to be placed, and E2 expresses the signal strength for the sampling point stored in local.

If no signal strength of the sampling point is stored in local, the sampling point is only within the signal coverage range of the AP to be placed, and the newly-added signal strength E generated at the sampling point by the AP to be placed satisfies the following formula (3):

$$E=E1 \quad (3).$$

Based on examples of the present disclosure, it is described in detail how the newly-added signal strength E is calculated in a case that the signal coverage ranges of the APs are overlapped.

For example, as shown in FIG. 6, taking an AP to be placed as an example for description, where the AP to be placed is denoted as AP1. A sampling point currently traversed is a black-filled sampling point, the black-filled sampling point without placing AP is selected as the sampling point at which the AP1 is to be placed. For a left diagonal-filled sampling point under a signal coverage range of the AP1, if a signal strength of the left diagonal-filled sampling point has been already stored in local, it is indicated that the left diagonal-filled sampling point is also within a signal coverage range of an AP previously placed, where the signal strength E2 of the sampling point stored in local is equal to 1. Since the signal strength E1 generated at the sampling point by the AP1 is larger than the stored signal strength E2 for the sampling point, where E1=3 and E2=1 the newly-added signal strength generated at the sampling point by the AP1 is: E=3−1=2. Further, after the AP1 is placed at the sampling point, the signal strength of the sampling point stored in local may be updated to a maximum value of E1 and E2, i.e., 3, in block S403.

If no signal strength of the sampling point is stored in local, it is indicated that the sampling point has not been covered by a signal of an AP previously placed in another sampling point. The newly-added signal strength E generated at the sampling point by the AP1 is equal to E1, where E1=3. Further, after the AP1 is placed at the sampling point, the signal strength of the sampling point E1 may be updated to 3 in block S403.

When the newly-added valid signal strength $E_{eff}$ is calculated, the newly-added signal strength E generated at the sampling point by the AP to be placed is used. Thus, in a case that the AP to be placed is close to the AP previously placed in another sampling point, the newly-added valid signal strength $E_{eff}$ of the AP to be placed may be small, which cannot reach the preset valid signal strength ratio threshold T, thereby avoiding signal interference caused because the AP to be placed is too close to the AP previously placed.

(2) An Obstacle Blocks a Signal of an AP

When there is the obstacle under a signal coverage range of the AP to be placed, the signal strength E1 generated at the sampling point by the AP to be placed is a signal strength value attenuated after passing through the obstacle.

For each material, since the obstacle with the material has a corresponding attenuation value, an attenuated signal strength value may be obtained by subtracting the attenuation value corresponding to the obstacle from the signal strength value. When the signal strength is expressed through an indicative value, the attenuated indicative signal strength value may be calculated based on a designated ratio. For example, when a range of the indicative value is 0 to 5 and a range of a value calculated based on an actual signal strength of the AP is 0 to 90, the indicative value of the attenuated signal strength is equal to a value obtained by multiplying $$\frac{90}{5}$$

by a value of the attenuated signal strength actually calculated.

As shown in FIG. 7, when traversal is performed to the black-filled sampling point and the AP1 is placed at the black-filled sampling point, the signal strength E1 generated at the left diagonal-filled sampling point by the AP1 is attenuated to 1 after the signal of the AP1 is blocked by the obstacle illustrated by a vertical line in FIG. 7.

Subsequently, as shown in FIG. 8, when the traversal is performed to a right diagonal-filled sampling point and it is assumed that an AP2 to be placed is placed at the right diagonal-filled sampling point, the signal strength of the left diagonal-filled sampling point is 2 because the signal strength generated at the left diagonal-filled sampling point by the AP2 is 2 which is more than 1.

On this basis, after the AP2 is really placed at the sampling point, the signal strength E1 of the sampling point may be updated to 2 in block S403.

It can be seen from FIGS. 7 and 8 that, the newly-added signal strength may be very small when obstacle blockage exists. Thus, it should be limited that the ratio obtained by dividing the newly-added valid signal strength by the maximum valid signal strength is more than the preset valid signal strength ratio threshold, so that signal coverage performance of APs can still be ensured even though the obstacle blockage exists.

In examples of the present disclosure, the signal strength may be referred to as field strength. For example, a signal strength generated at a sampling point by an AP is field strength generated at the sampling point by the AP; a maximum valid signal strength is a maximum value of a sum of field strengths generated at sampling points by an AP placed at a sampling point, which can be referred to as a maximum valid field strength; a newly-added valid signal strength is referred to as newly-added valid field strength; a newly-added invalid signal strength is referred to as newly-added invalid field strength; and a newly-added signal strength is referred to as newly-added field strength.

In methods in examples of the present disclosure above, based on a preset sampling spacing, a sampling point matrix is obtained by performing sampling in a locating area including a valid area to be covered by a WLAN and an invalid area outside the valid area, a sampling point without placing AP is sequentially selected from the sampling point matrix, which is taken as a sampling point to place an AP, it is determined whether a related parameter calculated in a case that the AP to be placed is placed at the sampling point satisfies a preset condition, if yes, the AP to be placed is placed at the sampling point, so as to ensure entire coverage for the valid area and save costs.

In addition, based on examples of the present disclosure, some cases are considered, which include that coverage ranges of multiples APs are overlapped, obstacle blockage exists, and density of a coverage is high are considered. Thus, the methods above are closer to the real scenario and more valuable to practice.

Methods based on the present disclosure are described above. Devices based on the present disclosure are described below.

Figure 9:
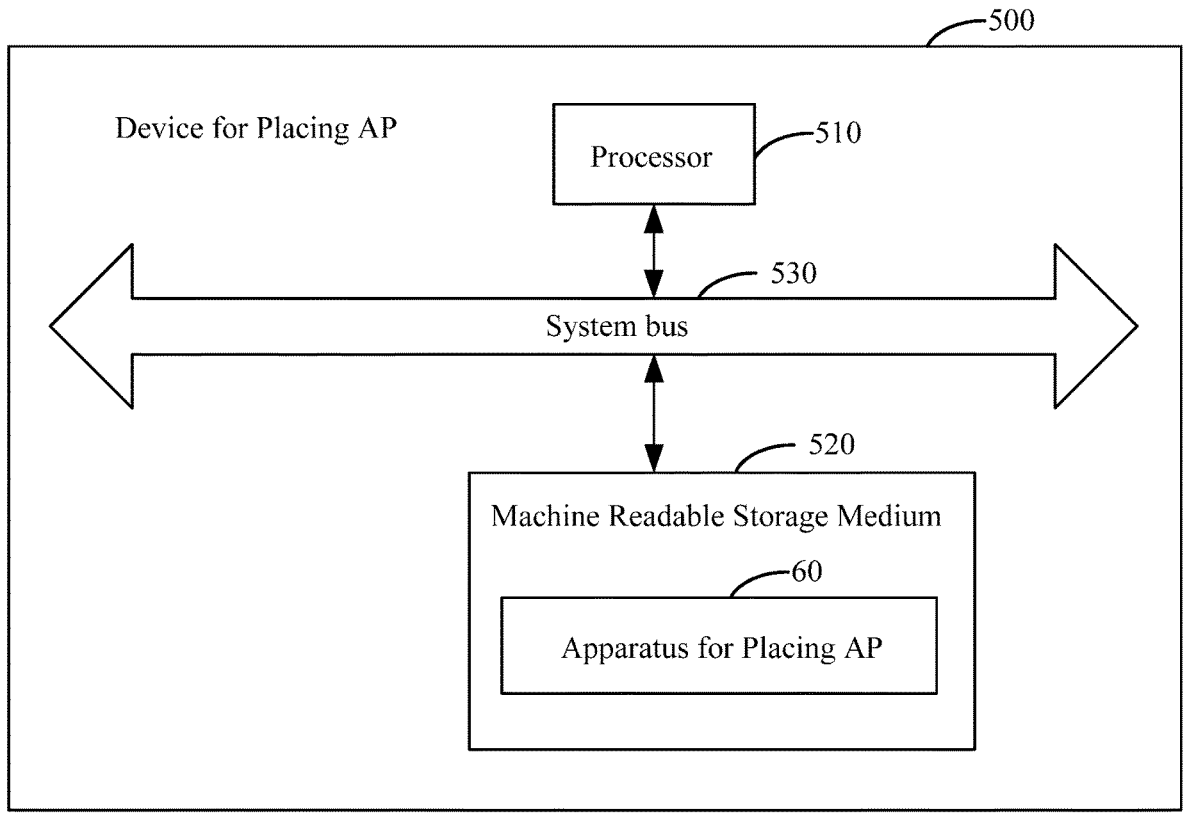
FIG. 9 is a schematic diagram illustrating a hardware structure of a device for placing an AP based on an example of the present disclosure.

FIG. 9 schematically illustrates a hardware structure diagram of a device for placing an AP, which is provided by an example of the present disclosure. The device 500 may include a processor 510 and a machine-readable storage medium 520 storing machine executable instructions. The processor 510 may communicate with the machine-readable storage medium 520 via a system bus 530, and execute the method of placing an AP described above by reading and executing the machine executable instructions corresponding to a packet transmitting control logic in the machine-readable storage medium 520.

As used herein, the machine-readable storage medium 520 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 10:
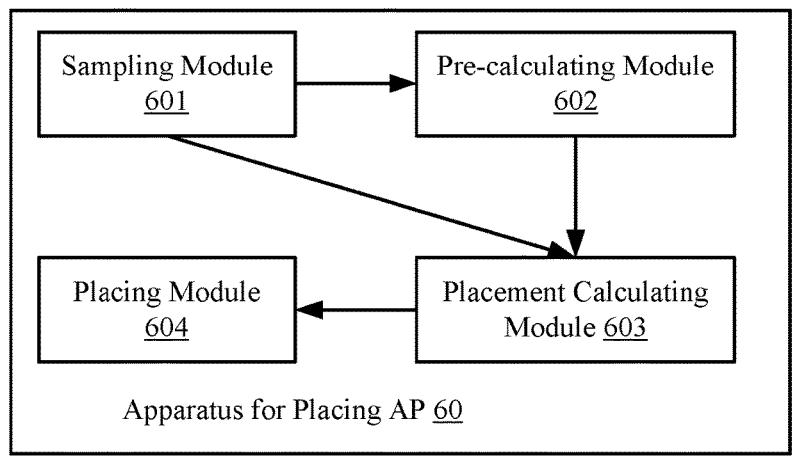
FIG. 10 is a schematic diagram illustrating a structure of an apparatus for placing an AP based on an example of the present disclosure.

As shown in FIG. 10, functionally divided, an apparatus 60 for placing an AP may include modules as follows.

A sampling module 601 is configured to obtain a sampling point matrix by performing sampling in a locating area based on a preset sampling spacing, wherein the locating area comprises: a valid area to be covered by a Wireless Local Area Network (WLAN) and an invalid area outside the valid area.

A pre-calculating module 602 is configured to calculate a maximum valid signal strength, wherein the maximum valid signal strength is a maximum value of a sum of signal strengths generated at sampling points by an AP placed at a sampling point.

A placement calculating module 603 is configured to sequentially select a sampling point without placing AP is placed from the sampling point matrix to be a first sampling point at which an AP is to be placed, calculating a newly-added valid signal strength and a newly-added invalid signal strength in a case that the AP to be placed is placed at the first sampling point, wherein the newly-added valid signal strength is a sum of newly-added signal strengths generated at sampling points in the valid area by the AP to be placed, the newly-added invalid signal strength is a sum of newly-added signal strengths generated at sampling points in the invalid area by the AP to be placed.

A placing module 604 is configured to place the AP to be placed at the first sampling point when preset conditions are satisfied, wherein the preset conditions comprise that: a ratio obtained by dividing the newly-added valid signal strength by the maximum valid signal strength is more than a preset valid signal strength ratio threshold, and a ratio obtained by dividing the newly-added invalid signal strength by the maximum valid signal strength is less than a preset invalid signal strength ratio threshold.

In an example, the pre-calculating module 602 is further configured to calculate a maximum valid point count, wherein the maximum valid point count is the total number of sampling points covered by the signal of the AP used for calculating the maximum valid signal strength.

The placement calculating module 603 is further configured to calculate a newly-added valid point count in the case that the AP to be placed is placed at the first sampling point, wherein the newly-added valid point count is the number of sampling points which are covered by the signal of the AP to be placed but not covered by a signal of any AP placed in the valid area.

The preset conditions further comprise that a ratio obtained by dividing the newly-added valid point count by the maximum valid point count is more than a preset newly-added valid point count ratio threshold.

In an example, the placement calculating modules 603 is configured to calculate a newly-add signal strength E generated at a second sampling point by the AP to be placed based on a method as follows, wherein the second sampling point is a sampling point covered by the AP to be placed:

when a signal strength of the second sampling point is stored in local, $$E = \begin{cases} E1 - E2, & E1 > E2 \\ 0, & E1 \le E2 \end{cases};$$

when no signal strength of the second sampling point is stored in local, E=E1; wherein E1 expresses a signal strength generated at the second sampling point by the AP to be placed;

E2 expresses the stored signal strength of the second sampling point.

In an example, when there is an obstacle in a coverage range of the signal of the AP to be placed, the signal strength E1 generated at the second sampling point by the AP to be placed is a signal strength value attenuated after passing through the obstacle.

Figure 11:
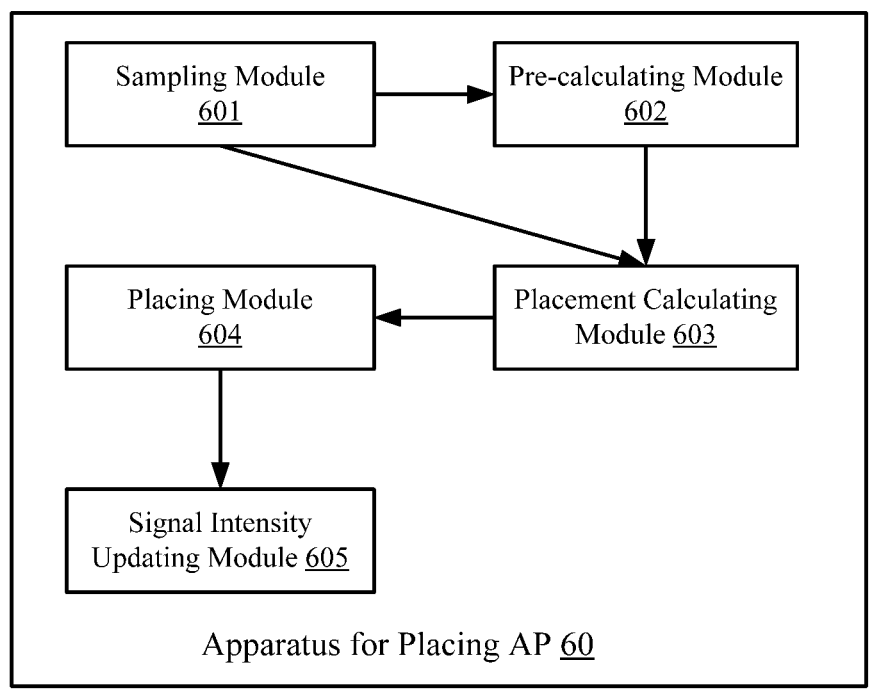
FIG. 11 is a schematic diagram illustrating another structure of an apparatus for placing an AP based on an example of the present disclosure.

Further, as shown in FIG. 11, the apparatus for placing an AP further includes a signal strength updating module 605.

The signal strength updating module 605 is configured to after the preset conditions are satisfied, for each of second sampling points covered by the signal of the AP to be placed, when a signal strength of the second sampling point is stored in local, updating the stored signal strength of the second sampling point to be a maximum value of the stored signal strength of the second sampling point and E1; when no signal strength of the second sampling point is stored in local, storing E1 as the signal strength of the second sampling point, wherein E1 expresses a signal strength generated at the second sampling point by the AP to be placed.

In an example, when the valid area is a rectangular area with a length M and a width N, the locating area is a rectangular area with a length M+2r and a width N+2r, wherein $$r = \sqrt{\frac{(M \times N) \times P}{\pi \times \text{Sum}}},$$

r expresses a signal coverage radius of a single AP; p expresses the number of users which can be accommodated by a single AP; and Sum expresses the total number of users to be accommodated in the valid area.

Implementation processes of functions and effects of each module in the apparatus above may be referred to implementation processes of the corresponding blocks in methods above, which is not redundantly described herein.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected based on actual demands to implement the objectives of the solutions in the embodiments. Those of ordinary skill in the art may understand and carry out them without creative work.

The above are merely descriptions of preferred embodiments of the present disclosure and not intended to limit the present disclosure. Any modifications, equivalent substitutions, adaptations thereof made without departing from the spirit and scope of the disclosure shall be encompassed in the claimed scope of the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and a device provided based on the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of placing an Access Point (AP), comprising:
obtaining, by a placing device, a sampling point matrix by performing sampling in a locating area based on a preset sampling spacing, wherein the locating area comprises: a valid area to be covered by a Wireless Local Area Network (WLAN) and an invalid area outside the valid area;
calculating, by the placing device, a maximum valid signal strength, wherein the maximum valid signal strength is a maximum value of a sum of signal strengths generated at sampling points by an AP placed at a sampling point;
sequentially selecting, by the placing device, a sampling point without AP being placed in the sampling point matrix to be a first sampling point for an AP to be placed, calculating a newly-added valid signal strength and a newly-added invalid signal strength in a case that the AP to be placed is placed at the first sampling point, wherein
the newly-added valid signal strength is a sum of newly-added signal strengths generated at sampling points in the valid area by the AP to be placed,
the newly-added invalid signal strength is a sum of newly-added signal strengths generated at sampling points in the invalid area by the AP to be placed;
placing, by the placing device, the AP to be placed at the first sampling point when preset conditions are satisfied, wherein the preset conditions comprise that:
a ratio obtained by dividing the newly-added valid signal strength by the maximum valid signal strength is more than a preset valid signal strength ratio threshold, and
a ratio obtained by dividing the newly-added invalid signal strength by the maximum valid signal strength is less than a preset invalid signal strength ratio threshold.

2. The method according to claim 1, further comprising:
calculating, by the placing device, a maximum valid point count, wherein the maximum valid point count is the total number of sampling points covered by a signal of the AP used for calculating the maximum valid signal strength; and
calculating, by the placing device, a newly-added valid point count in the case that the AP to be placed is placed at the first sampling point, wherein
the newly-added valid point count is the number of sampling points which are covered by the signal of the AP to be placed but not covered by a signal of an AP placed in the valid area;
the preset conditions further comprise that a ratio obtained by dividing the newly-added valid point count by the maximum valid point count is more than a preset newly-added valid point count ratio threshold.

3. The method according to claim 1, wherein a newly-add signal strength E generated at a second sampling point by the AP to be placed is calculated based on a method as follows, wherein the second sampling point is a sampling point covered by the AP to be placed:
when a signal strength of the second sampling point is stored in local, $$E = \begin{cases} E1 - E2, & E1 > E2 \\ 0, & E1 \leq E2 \end{cases};$$

when no signal strength of the second sampling point is stored in local, E=E1; wherein
E1 expresses a signal strength generated at the second sampling point by the AP to be placed;
E2 expresses the stored signal strength of the second sampling point.

4. The method according to claim 3, wherein when there is an obstacle in a coverage range of the signal of the AP to be placed, the signal strength E1 generated at the second sampling point by the AP to be placed is a signal strength value attenuated after passing through the obstacle.

5. The method according to claim 1, after the preset conditions are satisfied, further comprising:
for each of second sampling points covered by the signal of the AP to be placed,
when a signal strength of the second sampling point is stored in local, updating, by the placing device, the stored signal strength of the second sampling point to be a maximum value of the stored signal strength of the second sampling point and E1;
when no signal strength of the second sampling point is stored in local, storing, by the placing device, E1 as the signal strength of the second sampling point, wherein
E1 expresses a signal strength generated at the second sampling point by the AP to be placed.

6. The method according to claim 1, wherein when the valid area is a rectangular area with a length M and a width N, the locating area is a rectangular area with a length M+2r and a width N+2r, wherein $$r = \sqrt{\frac{(M \times N) \times P}{\pi \times \text{Sum}}},$$

r expresses a signal coverage radius of a single AP;
P expresses the number of users which can be accommodated by a single AP; and
Sum expresses the total number of users to be accommodated in the valid area.

7. A device for placing an Access Point (AP), comprising:
a processor, and
a non-transitory machine-readable storage medium storing machine executable instructions which are executable by the processor to:
obtain a sampling point matrix by performing sampling in a locating area based on a preset sampling spacing, wherein the locating area comprises: a valid area to be covered by a Wireless Local Area Network (WLAN) and an invalid area outside the valid area;
calculate a maximum valid signal strength, wherein the maximum valid signal strength is a maximum value of a sum of signal strengths generated at sampling points by an AP placed at a sampling point;
sequentially select a sampling point without AP being placed in the sampling point matrix to be a first sampling point for an AP to be placed, calculating a newly-added valid signal strength and a newly-added invalid signal strength in a case that the AP to be placed is placed at the first sampling point, wherein
the newly-added valid signal strength is a sum of newly-added signal strengths generated at sampling points in the valid area by the AP to be placed,
the newly-added invalid signal strength is a sum of newly-added signal strengths generated at sampling points in the invalid area by the AP to be placed;
place the AP to be placed at the first sampling point when preset conditions are satisfied, wherein the preset conditions comprise that:
a ratio obtained by dividing the newly-added valid signal strength by the maximum valid signal strength is more than a preset valid signal strength ratio threshold, and
a ratio obtained by dividing the newly-added invalid signal strength by the maximum valid signal strength is less than a preset invalid signal strength ratio threshold.

8. The device according to claim 7, wherein the processor is caused by the machine-executable instructions further to:
calculate a maximum valid point count, wherein the maximum valid point count is the total number of sampling points covered by a signal of the AP used for calculating the maximum valid signal strength; and
calculate a newly-added valid point count in the case that the AP to be placed is placed at the first sampling point, wherein
the newly-added valid point count is the number of sampling points which are covered by the signal of the AP to be placed but not covered by a signal of any AP placed in the valid area; and
the preset conditions further comprise that a ratio obtained by dividing the newly-added valid point count by the maximum valid point count is more than a preset newly-added valid point count ratio threshold.

9. The device according to claim 7, wherein a newly-add signal strength E generated at a second sampling point by the AP to be placed is calculated based on a method as follows, wherein the second sampling point is a sampling point covered by the AP to be placed:
when a signal strength of the second sampling point is stored in local, $$E = \begin{cases} E1 - E2, & E1 > E2 \\ 0, & E1 \leq E2 \end{cases};$$

when no signal strength of the second sampling point is stored in local, E=E1; wherein
E1 expresses a signal strength generated at the second sampling point by the AP to be placed;
E2 expresses the stored signal strength of the second sampling point.

10. The device according to claim 9, wherein when there is an obstacle in a coverage range of the signal of the AP to be placed, the signal strength E1 generated at the second sampling point by the AP to be placed is a signal strength value attenuated after passing through the obstacle.

11. The device according to claim 7, wherein the processor is caused by the machine-executable instructions further to:
for each of second sampling points covered by the signal of the AP to be placed,
when a signal strength of the second sampling point is stored in local, updating the stored signal strength of the second sampling point to be a maximum value of the stored signal strength of the second sampling point and E1;
when no signal strength of the second sampling point is stored in local, storing E1 as the signal strength of the second sampling point, wherein
E1 expresses a signal strength generated at the second sampling point by the AP to be placed.

12. The device according to claim 7, wherein when the valid area is a rectangular area with a length M and a width N, the locating area is a rectangular area with a length M+2r and a width N+2r, wherein $$r = \sqrt{\frac{(M \times N) \times P}{\pi \times \mathrm{Sum}}},$$

r expresses a signal coverage radius of a single AP;
P expresses the number of users which can be accommodated by a single AP; and
Sum expresses the total number of users to be accommodated in the valid area.

* * * * *